(12) United States Patent
Inoue (10) Patent No.: US 9,579,983 B2
(45) Date of Patent: Feb. 28, 2017

(54) ELECTRIC VEHICLE

(71) Applicant: KAWASAKI JUKOGYO KABUSHIKI KAISHA, Kobe-shi, Hyogo (JP)

(72) Inventor: Masafumi Inoue, Miki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/654,044

(22) PCT Filed: Dec. 25, 2012

(86) PCT No.: PCT/JP2012/008251
§ 371 (c)(1),
(2) Date: Jun. 19, 2015

(87) PCT Pub. No.: WO2014/102853
PCT Pub. Date: Jul. 3, 2014

(65) Prior Publication Data
US 2015/0314692 A1    Nov. 5, 2015

(51) Int. Cl.
*H02P 1/00* (2006.01)
*B60L 11/18* (2006.01)
(Continued)

(52) U.S. Cl.
CPC ............ *B60L 11/1805* (2013.01); *B60K 1/00* (2013.01); *B60K 1/04* (2013.01); *B60L 11/1818* (2013.01); *B60L 11/1877* (2013.01); *B60L 11/1879* (2013.01); *B60L 15/007* (2013.01); *B62J 9/00* (2013.01); *B62J 99/00* (2013.01); *B62K 19/30* (2013.01); *H01M 10/00* (2013.01); *B60L 2200/12* (2013.01); *B60L 2210/30* (2013.01); *B60L 2210/40* (2013.01);
(Continued)

(58) Field of Classification Search
CPC ... B60K 1/04; B62K 2208/00; B60L 11/1877; B60L 11/1879
See application file for complete search history.

(56) References Cited

U.S. PATENT DOCUMENTS 8,862,296 B2 * 10/2014 Kurakawa ................ B60K 1/04
                                                       701/22
2014/0262568 A1 * 9/2014 Matsuda ................ B62K 11/04
                                                       180/65.1

FOREIGN PATENT DOCUMENTS

JP    H08072780 A    3/1996
JP    H11227668 A    8/1999
(Continued)

OTHER PUBLICATIONS

ISA Japanese Patent Office, International Search Report Issued in Application No. PCT/JP2012/008251, Apr. 2, 2013, WIPO, 2 pages.

*Primary Examiner* — Karen Masih
(74) *Attorney, Agent, or Firm* — Alleman Hall McCoy Russell & Tuttle LLP (57) ABSTRACT

An electric vehicle comprises an electric motor which generates driving power for driving a wheel; a battery case accommodating a battery storing DC power to be supplied to the electric motor, in a battery space in an interior of the battery case; and a plurality of electric components electrically connected to the battery and placed above the battery, wherein the plurality of electric components are placed in a plurality of layers, and arranged vertically to overlap with each other when viewed from above.

9 Claims, 11 Drawing Sheets

(51) Int. Cl.
- *B60K 1/04* (2006.01)
- *B62J 9/00* (2006.01)
- *B62J 99/00* (2009.01)
- *B62K 19/30* (2006.01)
- *B60K 1/00* (2006.01)
- *B60L 15/00* (2006.01)
- *H01M 10/00* (2006.01)

(52) U.S. Cl.
CPC ..... *B60L 2270/147* (2013.01); *B60Y 2200/12* (2013.01); *B62K 2204/00* (2013.01); *Y02T 10/645* (2013.01); *Y02T 10/7005* (2013.01); *Y02T 10/705* (2013.01); *Y02T 10/7241* (2013.01)

(56) References Cited

FOREIGN PATENT DOCUMENTS

| | | |
|---|---|---|
| JP | 2003189539 A | 7/2003 |
| JP | 2010083333 A | 4/2010 |
| JP | 2011234559 A | 11/2011 |
| WO | 2012104592 A1 | 8/2012 |

* cited by examiner

ELECTRIC VEHICLE

TECHNICAL FIELD

The present invention relates to an electric vehicle which drives a wheel with driving power generated in an electric motor.

BACKGROUND ART

In recent years, an electric motorcycle which drives a wheel with driving power generated in an electric motor with electric power supplied from batteries has been developed. Patent Literature 1 discloses an electric motorcycle in which batteries are accommodated in a battery accommodating section placed below a seat, and an inverter is placed on a floor panel below the batteries.

CITATION LIST

Patent Literature

Patent Literature 1: Japanese Laid-Open Patent Application Publication No. 2011-234559

SUMMARY OF INVENTION

Technical Problem

In order to increase the cruising distance of the vehicle, it is necessary to increase the batteries in size. However, in the above configuration, the batteries are placed higher than electric components such as the inverter. Because of the layout of the batteries with a heavy weight, the center of gravity of a vehicle body is made higher. In a case where a plurality of electric components are placed in different locations spaced apart from the batteries, these electric components occupy space for other components, and high-voltage electric wires connecting the electric components to the batteries are increased in length.

Accordingly, an object of the present invention is to reduce electric wires in length while lowering the center of gravity of an electric motorcycle.

Solution to Problem

The present invention provides an electric vehicle comprising: an electric motor which generates a driving power for driving a wheel; a battery case accommodating a battery storing DC power to be supplied to the electric motor, in a battery space in an interior of the battery case; and a plurality of electric components electrically connected to the battery and placed above the battery, wherein the plurality of electric components are placed in a plurality of layers, and arranged vertically to overlap with each other when viewed from above.

In accordance with this configuration, the plurality of electric components are placed in a plurality of layers and arranged vertically to overlap with each other when viewed from above, in a location above the battery. Therefore, the battery with a heavy weight can be placed at a lower side to lower the center of gravity of a vehicle body. Since the plurality of electric components are placed in a plurality of layers and arranged vertically, in a location above the battery, the electric components can be made close to the battery to reduce the electric wires of the electric components in length, and the plurality of electric components can be laid out in a compact manner, in a space above the battery.

The plurality of electric components may be placed above the battery case.

In accordance with this configuration, the members of the electric components are not accommodated in the battery case.

The plurality of electric components may include a relay provided on a current supply path connected to the battery to open and close the current supply path, the inverter may be placed above the battery case, forming a gap with an upper surface of the battery case, and the relay may be placed between the battery case and the inverter.

In accordance with this configuration, the inverter with a larger occupation area than that of the relay is placed above the relay at a distance from the upper surface of the battery case. In this layout, the relay can be placed between the battery case and the inverter more flexibly, and the electric wires extending from the interior of the battery case and connected to the relay can be reduced in length.

The electric vehicle may further comprise: an electric component cover covering the plurality of electric components placed above the battery case, from above.

In accordance with this configuration, the water-proofing of the battery case can be improved.

The plurality of electric components may include an electric component in a strong electric system and a plurality of electric components in a weak electric system, and the electric component in the strong electric system may be placed below at least one of the plurality of electric components in the weak electric system.

In accordance with this configuration, the electric wire connecting the electric component in the strong electric system to the battery can be reduced in length.

The electric vehicle may further comprise an electromagnetic shield member interposed between a first electric component and a second electric component of the plurality of electric components, to isolate the first electric component and the second electric component from each other, wherein at least one of the first electric component and the second electric component may include a switching element.

In accordance with this configuration, the electromagnetic shield member serves to prevent electromagnetic noise generated in the switching element from being transmitted to other electric components.

The electromagnetic shield member may support at least one of the plurality of electric components.

In accordance with this configuration, since the electromagnetic shield member serves to support at least one of the plurality of electric components placed in a plurality of layers, the members can be reduced in number.

The electric vehicle may further comprise: an electric component cover placed on an upper side of the battery case to form an electric component space accommodating the plurality of electric components; and a service plug accommodated in the electric component space and capable of disconnecting a power supply circuit, wherein the electric component cover may have a plug opening through which the service plug is exposed, the electric component cover may be detachably fastened to the battery case by a fastening unit, the service plug may be operated to a disconnection position at which the power supply circuit is disconnected, or a connection position at which the power supply circuit is connected, in a state in which the service plug is operated to the disconnection position, the fastening unit may be exposed from the service plug and may be detachable, and the electric component cover may be detachable, and in a state in which the service plug is operated to the connection position, the fastening unit may be hidden by the service plug and may not be detachable, and the electric component cover may not be detachable.

In accordance with this configuration, the electric component cover cannot be detached unless the service plug disconnects the power supply circuit. This makes it possible to prevent a situation in which the electric component cover is detached and maintenance of the electric components is carried out in the state in which the power supply circuit is connected.

Advantageous Effects of Invention

As should be appreciated from the above description, in accordance with the present invention, a battery with a heavy weight is placed at a lower side to lower the center of gravity of a vehicle body and electric components are made close to the battery to reduce the electric wires of the electric components in length.

DESCRIPTION OF EMBODIMENTS

Hereinafter, the embodiment will be described with reference to the drawings.

Figure 1:
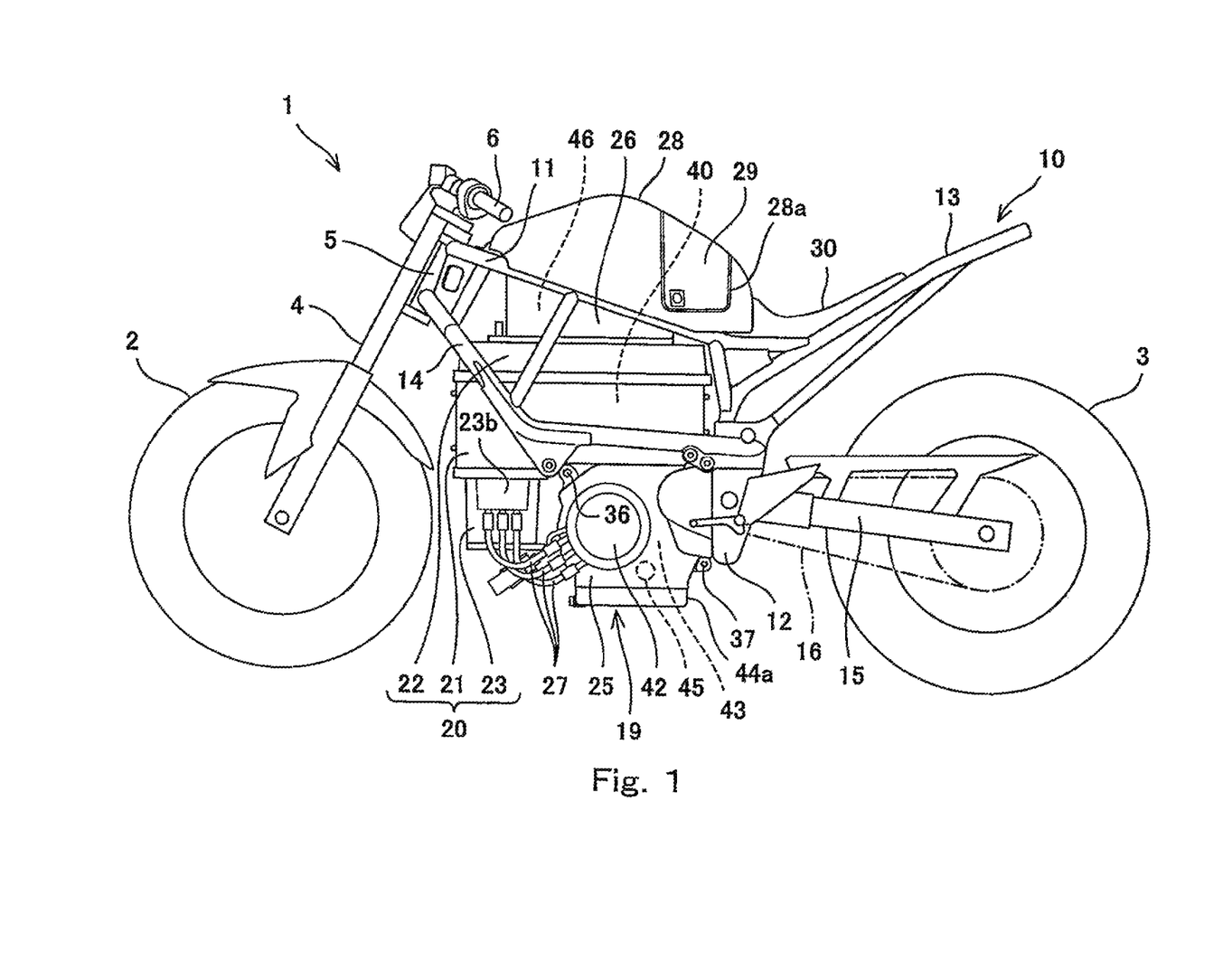
FIG. 1 is a left side view of an electric motorcycle according to an embodiment.
Figure 2:
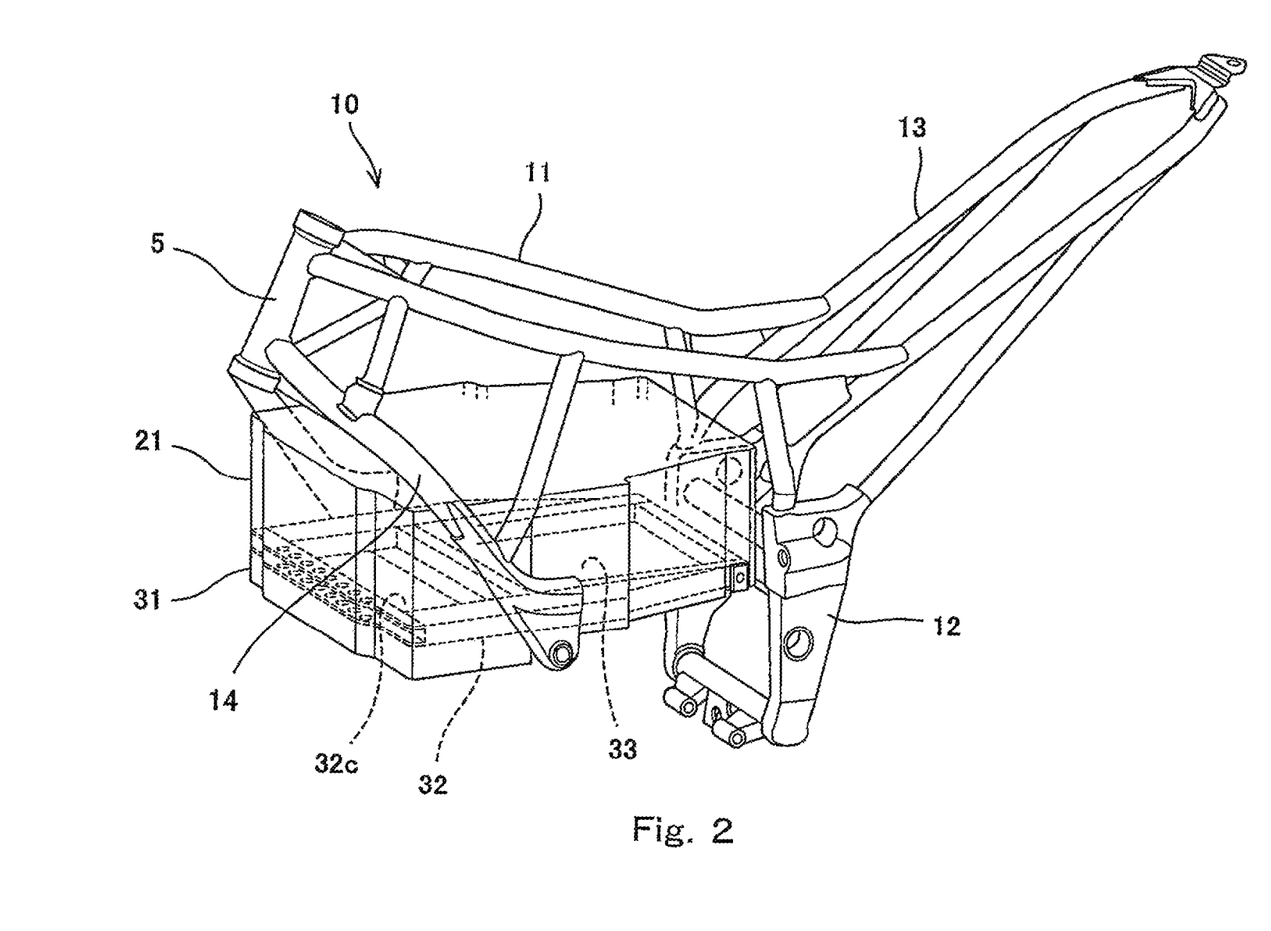
FIG. 2 is a perspective view of a vehicle body frame of the electric motorcycle of FIG. 1, when viewed from the left and front.

FIG. 1 is a left side view of an electric motorcycle 1 according to the embodiment of the present invention. FIG. 2 is a perspective view of a vehicle body frame 10 of the electric motorcycle 1 of FIG. 1, when viewed from the left and front. As shown in FIG. 1, the electric motorcycle 1 which is a straddle-type electric vehicle includes a front wheel 2 which is a driven wheel, and a rear wheel 3 which is a drive wheel. The front wheel 2 is rotatably mounted to the lower end portion of a front fork 4. The upper portion of the front fork 4 is integrated with a steering shaft (not shown). The steering shaft is rotatably supported by a head pipe 5 of a vehicle body in a state in which the steering shaft is inserted into the head pipe 5. A bar-type handle 6 extending in a rightward and leftward direction is attached to the steering shaft, and an accelerator grip (not shown) is provided at the right side of the handle 6.

As shown in FIGS. 1 and 2, a vehicle body frame 10 of the electric motorcycle 1 includes a pair of right and left main frames 11 extending rearward from the head pipe 5 such that they are inclined slightly downward. A pair of right and left down frames 14 are coupled to the front end portions of the main frames 11, respectively such that the down frames 14 extend downward therefrom, and then rearward. The rear end portions of the main frames 11 are connected to the upper portion of a pivot frame 12 of a frame shape. The front end portion of a swing arm 15 is mounted to the pivot frame 12 such that the swing arm 15 supports the rear wheel 3 and is vertically pivotable. A rear frame 13 is placed above the swing arm 15 and is connected to the rear end portions of the main frames 11.

The vehicle body frame 10 supports a power unit 19 in a space formed between the head pipe 5 and the pivot frame 12. The power unit 19 includes a plurality of batteries 40, an electric motor 42, an inverter 47 (see FIG. 3), and others which are integrated. The plurality of batteries 40 are accommodated into a battery case 20. The battery case 20 includes a middle case 21 which has a tubular shape in which upper and lower sides thereof are opened, and the lower end of a rear section is closed, an upper case 22 attached to the middle case 21 to close an upper opening in the middle case 21, and a lower case 23 attached to the middle case 21 to close a lower opening in the front section of the middle case 21.

The middle case 21 includes a case body 31 of a rectangular tubular shape which is made of a resin, and a frame member 32 which is provided inside of the case body 31 and made of metal. The frame member 32 is placed to extend horizontally in the lower portion of the middle case 21. The batteries 40 accommodated in the middle case 21 are supported from below by the frame member 32. The frame member 32 of the middle case 21 is fastened to the down frames 14. In other words, the frame member 32 made of metal which is a portion of the battery case 20 constitutes a portion of the vehicle body frame 10.

A motor unit 25 is mounted to the battery case 20 in a location that is rearward relative to the lower case 23 and below the middle case 21. Specifically, the motor unit 25 is fastened to the frame member 32 of the middle case 21 and the pivot frame 12 by brackets 36, 37. The motor unit 25 includes a casing 44, the electric motor 42 accommodated in the casing 44 to generate a driving power for moving the vehicle body, a transmission 43 accommodated in the casing 44 to change the speed of a rotational driving power output from the electric motor 42, an oil pan 44a attached to the lower portion of the casing 44, and an oil pump 45 which suctions up and discharges oil stored in the oil pan 44a. The rotational driving power output from the transmission 43 is transmitted to the rear wheel 3 via a chain 16.

An electric component cover 26 is attached to the upper surface of the battery case 20 to form an electric component space accommodating an electric component group 46, together with the upper case 22. The electric component cover 26 is insulative, and is made of, for example, an insulating resin material. The electric component cover 26 is covered by an upper cover 28 which is a dummy tank which looks like a fuel tank of a conventional engine-driven motorcycle. The electric component cover 26 is made of, for example, a metal material and lower in strength than the upper cover 28 is. The rear portion of the upper cover 28 is formed with a connector opening 28a through which a charging connector 75 (see FIG. 5) which will be described later, is exposed. The connector opening 28a is closed by a connector lid member 29. The rear portion of the upper cover 28, corresponding to the connector lid member 29, is smaller in dimension in a vehicle width direction than the center portion of upper cover 28, covering the electric component cover 26. A driver seat 30 supported by the rear frame 13 is placed rearward relative to the upper cover 28. The driver seated on the seat 30 can retain the upper cover 28 with their legs. The upper surface of the battery case 20 is located lower than the upper end of the seat 30. In this configuration, even when the electric component group 46 including the inverter 47 and the like is placed on the battery case 20, it becomes possible to lessen the amount of the electric component group 46 which protrudes upward from a virtual line connecting the seat 30 to the head pipe 5.

The batteries 40 are placed between the head pipe 5 and the seat 30. At least a portion of the batteries 40 is placed above and forward relative to footrests of the vehicle body, and between the legs of the driver seated on the seat 30. The electric motor 42 is placed between the head pipe 5 and the seat 30. The electric motor 42 is supported on the pivot frame 12 and is configured to not be pivoted together with the swing arm 15.

Figure 3:
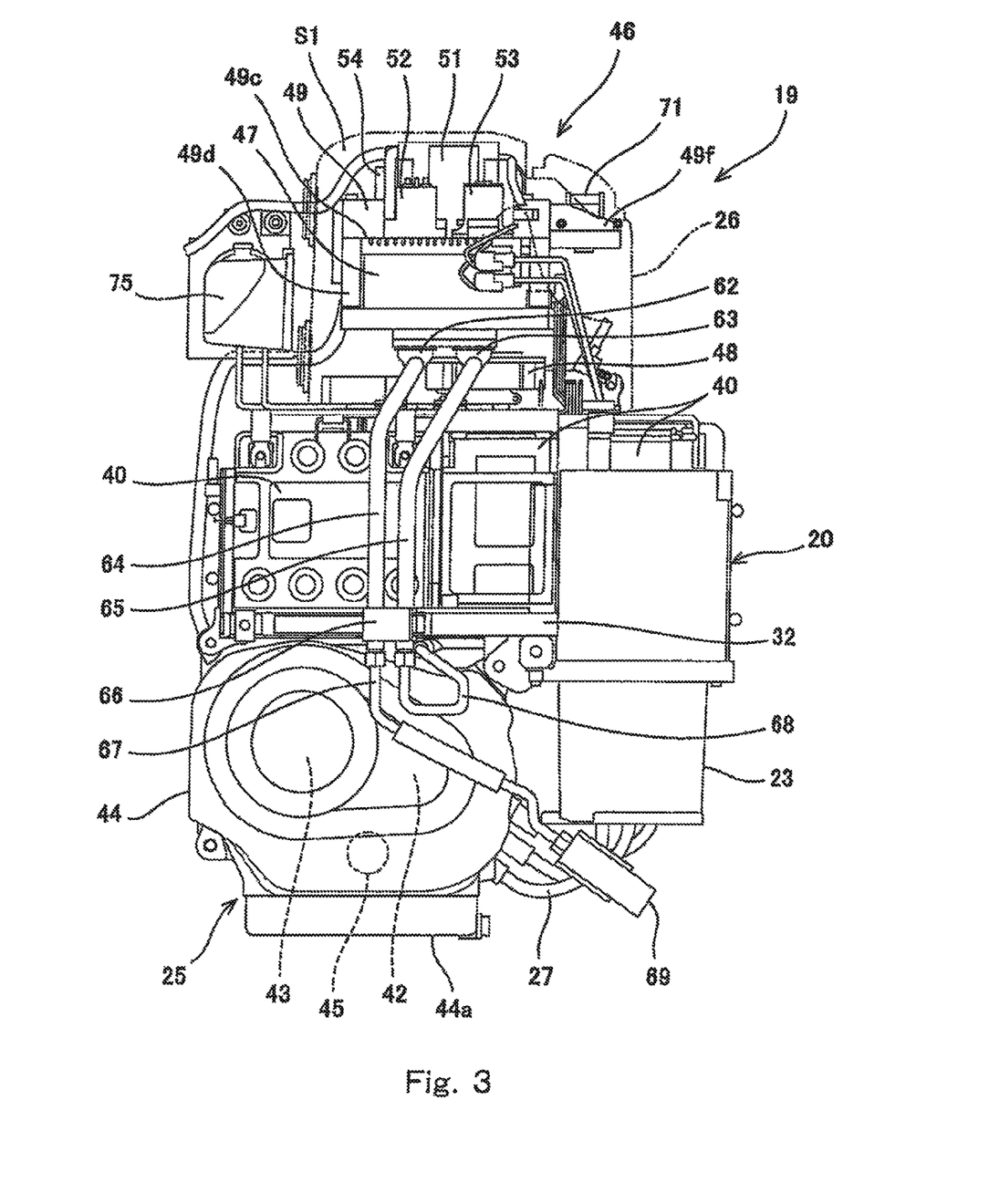
FIG. 3 is a right side view of a power unit of the electric motorcycle of FIG. 1.
Figure 4:
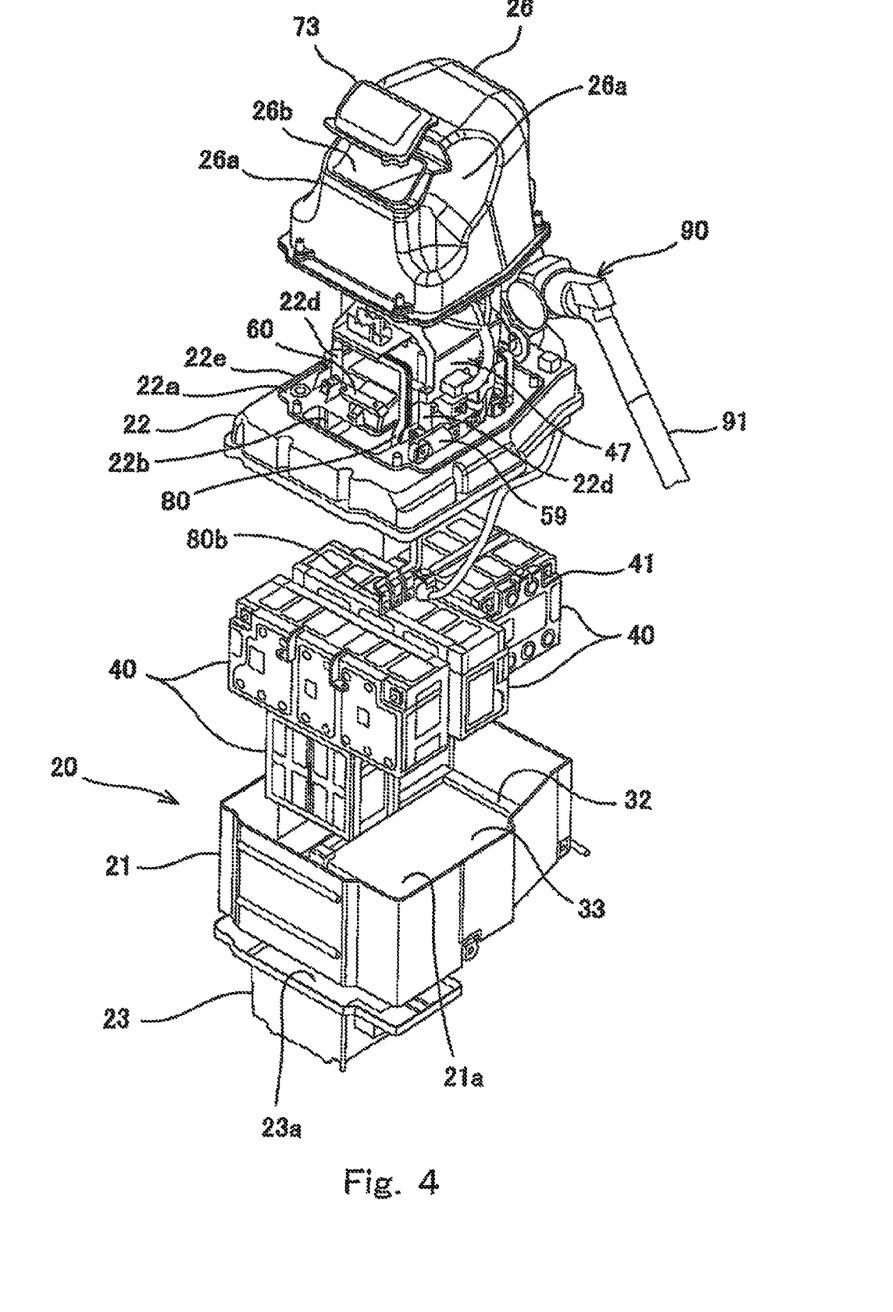
FIG. 4 is an exploded perspective view of the power unit (electric motor device is not shown) of the electric motorcycle of FIG. 1, when viewed from the left and front.
Figure 5:
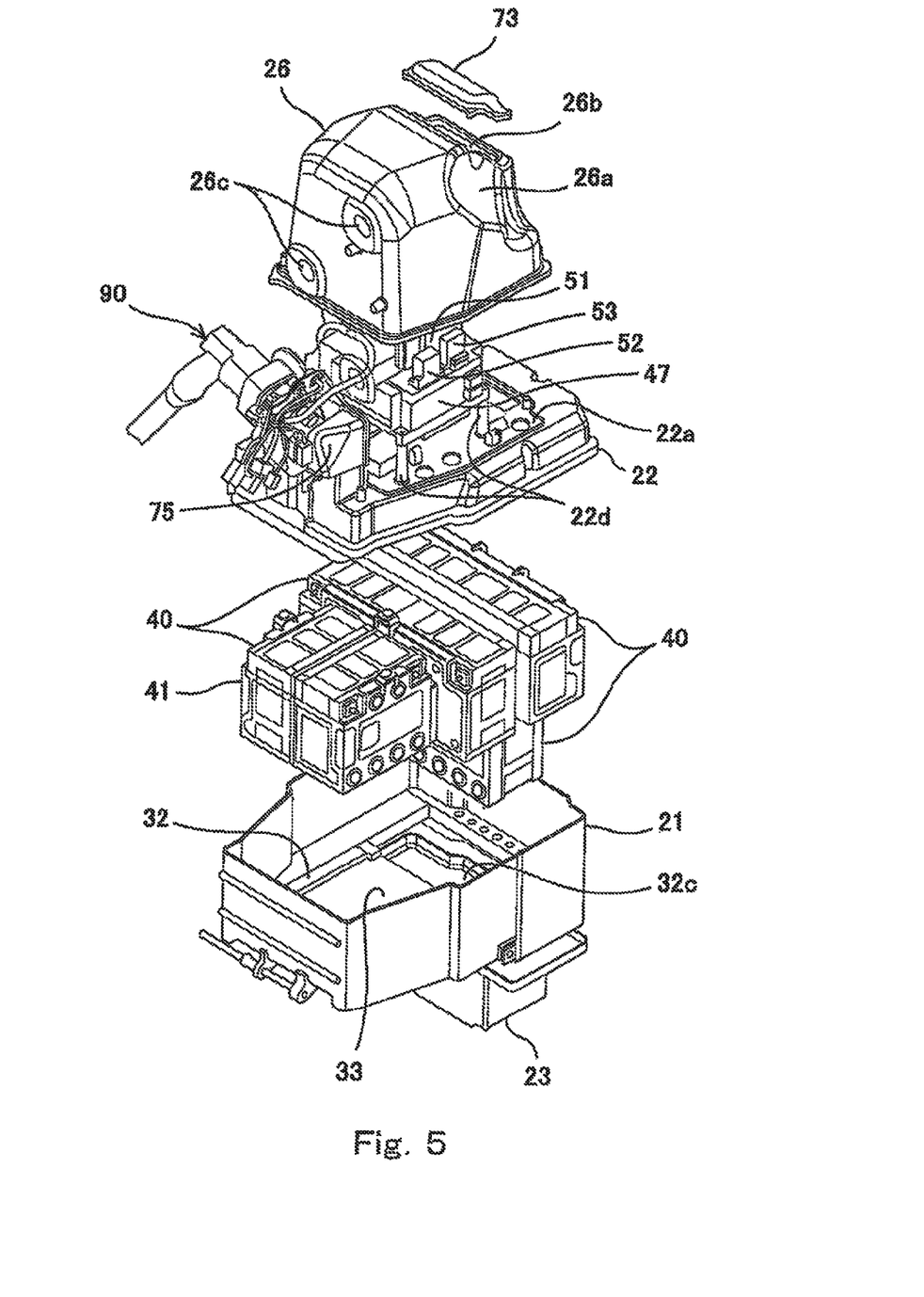
FIG. 5 is an exploded perspective view of the power unit (electric motor device is not shown) of the electric motorcycle of FIG. 1, when viewed from the right and rear.
Figure 6:
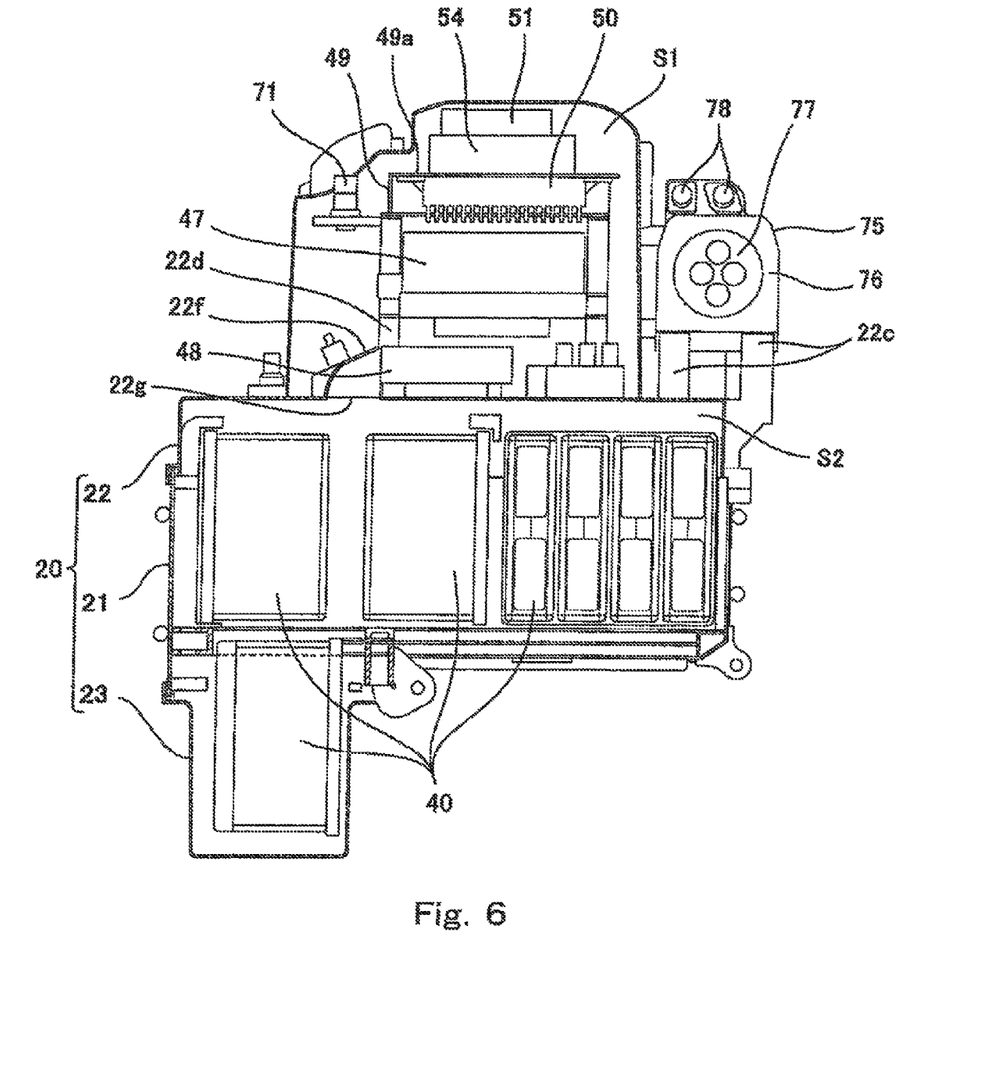
FIG. 6 is a longitudinal sectional view of the power unit (electric motor device is not shown) of the electric motorcycle of FIG. 1, when viewed from the left.

FIG. 3 is a right side view of the power unit 19 of the electric motorcycle 1 of FIG. 1. FIG. 4 is an exploded perspective view of the power unit 19 (the motor unit 25 is not shown) of the electric motorcycle 1 of FIG. 1, when viewed from the left and front. FIG. 5 is an exploded perspective view of the power unit 19 (the motor unit 25 is not shown) of the electric motorcycle 1 of FIG. 1, when viewed from the right and rear. FIG. 6 is a longitudinal sectional view of the power unit 19 (the motor unit 25 is not shown) of the electric motorcycle 1 of FIG. 1, when viewed from the left. As shown in FIGS. 3 to 6, the plurality of batteries 40 storing DC power to be supplied to the electric motor 42 are aligned in a battery space S2 in the interior of the battery case 20. The plurality of batteries 40 are integrated by a casing 41 as an assembly to form a battery group. The battery group is placed in such a manner that its front portion is larger in width than its rear portion in the vehicle width direction (rightward and leftward direction). This makes it possible to prevent an increase in the vertical dimension of the whole of the batteries 40, while increasing the capacity of the whole of the batteries 40. Correspondingly, each of the middle case 21 and the upper case 22 is configured in such a manner that its front portion is larger in width than its rear portion. This allows the driver seated on the seat 30 to easily retain the battery case 20 with their legs.

The rear region of the region of the middle case 21, which is surrounded by the frame member 32, is closed by a bottom plate 33 made of metal, which is fastened to the frame member 32 by welding, while the front region of the region of the middle case 21, which is surrounded by the frame member 32, forms an opening 32c which is in communication with the inner space of the lower case 23. In the interior of the middle case 21 and the upper case 22, the plurality of batteries 40 are accommodated such that they are placed on the frame member 32 and the bottom plate 33. The batteries 40 are also accommodated in the interior of the lower case 23. In other words, the middle case 21 and the upper case 22 constitute an upper battery accommodating section, while the lower case 23 constitutes a lower battery accommodating section. The lower case 23 as the lower battery accommodating section is shorter in length in the forward and rearward direction than the middle case 21 and the upper case 22 as the upper battery accommodating section, and is connected to the front lower portion of the middle case 21. The motor unit 25 is placed immediately behind the lower case 23 and immediately below the middle case 21.

In other words, the electric motor 42 is placed below the battery case. More specifically, in the present embodiment, the electric motor 42 is placed below the rear portion of the battery case 20 and rearward relative to the front portion of the battery case 20. The front portion of the battery case 20 protrudes downward. The upper surface of the electric motor 42 is placed above the lowermost surface of the battery case 20. The front surface of the electric motor 42 is placed forward relative to the rearmost surface of the battery case 20. This allows the batteries 40 and the electric motor 42 to be close to each other, and the lower end of the battery case 20 to be located as low as possible. Since the terminal block of the electric motor 42 is placed below the upper surface of the batteries 40, at least a portion of an electric wire connecting the inverter 47 to the electric motor 42 passes through the interior of the battery case 20.

The upper surface of the upper case 22 of the battery case 20 is formed with an electric component region 22a surrounded by a peripheral rib 22e. The electric component cover 26 is placed over the upper surface of the upper case 22 along the peripheral rib 22e, thereby forming an electric component space S1. The electric component cover 26 is formed with a recess 26a corresponding to a recess 28d of the upper cover 28. In the electric component space S1, the electric component group 46 is placed. In other words, the electric component group 46 is placed above the batteries 40 to overlap with the batteries 40 when viewed from above. The electric component group 46 includes electric components associated with a high-voltage current of the batteries 40, through which the high-voltage current flows. For example, the electric component group 46 includes at least one of the inverter 47 (switching device), a DC/DC converter 50 (transformer), a ground leakage sensor 51, a DC/DC converter relay 52, a varistor 53, a discharging relay 55, a charging relay 57, a fuse 59, a precharge resistor 60, and a service plug 71. In the present embodiment, the electric component group 46 includes all of the inverter 47, the DC/DC converter 50, the ground leakage sensor 51, the DC/DC converter relay 52, the varistor 53, the discharging relay 55, the charging relay 57, the fuse 59, the precharge resistor 60, and the service plug 71. Further, the electric component group 46 may include electric components associated with a low-voltage current. In the present example, the electric component group 46 includes a fan 48 and an ECU 54 (control device). Between the motor unit 25 and the inverter 47, oil, as a cooling medium, is circulated via cooling medium pipes 64, 65, an oil pump 45, an oil cooler 69, etc., to cool the inverter 47 and the electric motor 42.

The upper case 22 of the battery case 20 is provided with a seat section 22c protruding upward from the upper surface thereof, in a location that is rearward relative to the electric component cover 26. The charging connector 75 is mounted on the seat section 22c, to charge the batteries 40 with the electric power supplied externally. More specifically, the charging connector 75 is integrated with the battery case 20 outside of the battery case 20 to constitute a portion of the power unit 19. The charging connector 75 is placed above the batteries 40 to overlap with the batteries 40 when viewed from above. The rear wall portion of the electric component cover 26 is formed with an insertion hole 26c. The electric wire extending from the charging connector 75 is guided to the electric component space S1 through the insertion hole 26c. The charging connector 75 is provided with a connector connection surface 76 to which a power supply connector 90 of an L-shape connected to an outside power supply via a cable 91 is connected. The connector connection surface 76 faces the vehicle width direction (in the present example, leftward). The connector connection surface 76 is provided with a quick charging connector 77 and a normal charging connector 78. The quick charging connector 77 and the normal charging connector 78 are arranged at upper and lower sides, respectively. The charging connector 75 is placed outward and rearward relative to the electric component cover 26 and inward relative to the upper cover 28 (see FIG. 1).

Figure 7:
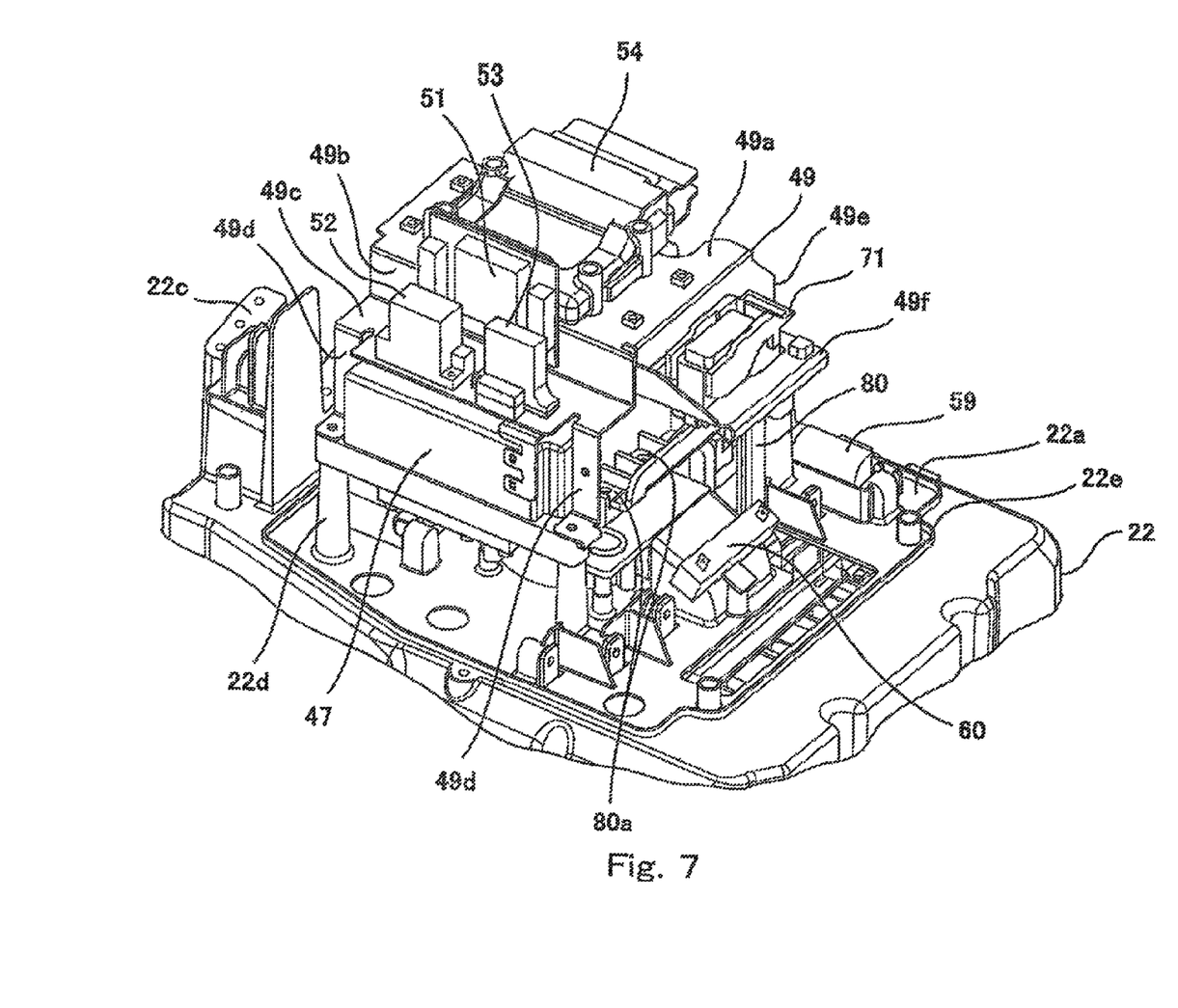
FIG. 7 is a perspective view of a region above a battery case of the electric motorcycle of FIG. 1, when viewed from the right and front.
Figure 8:
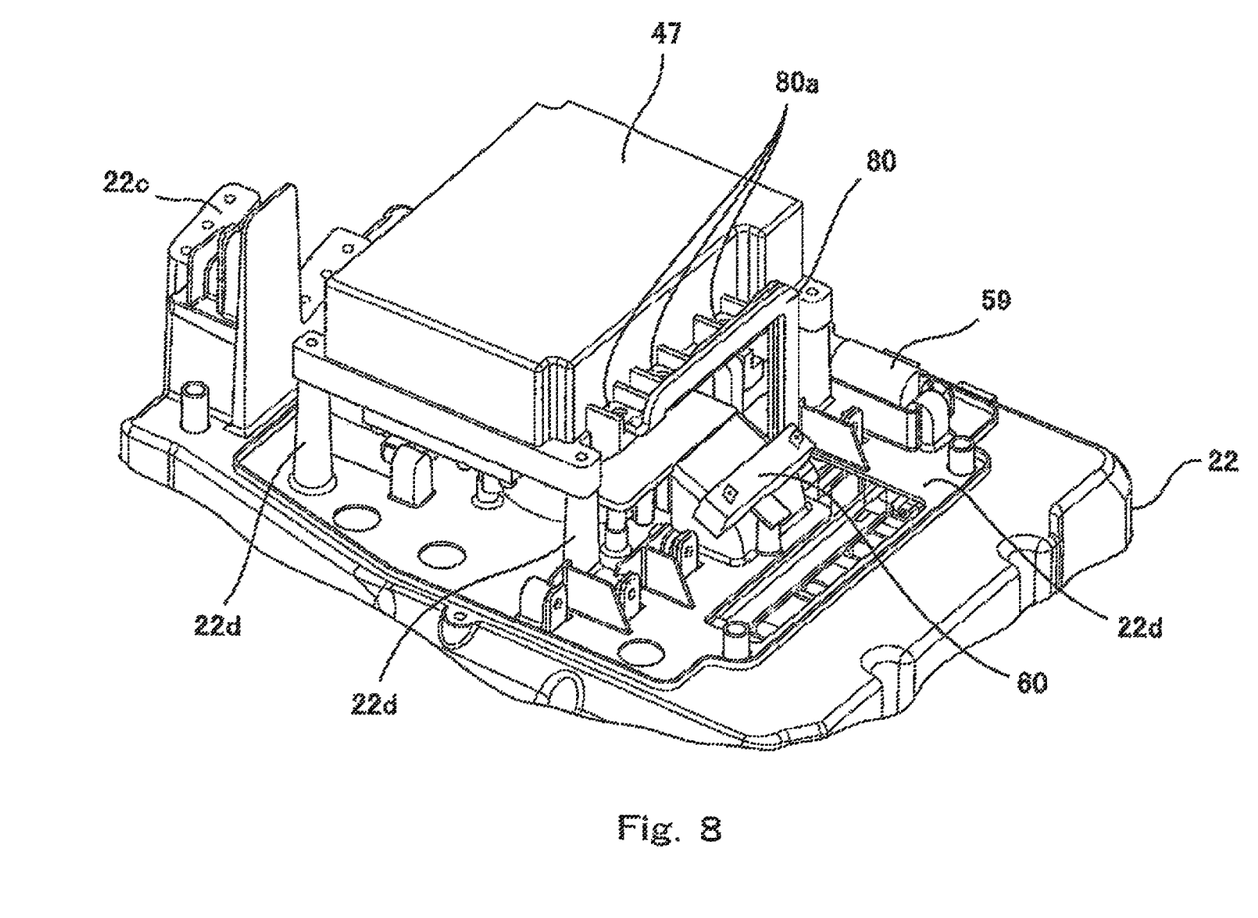
FIG. 8 is a perspective view showing a state in which an ECU, a DC/DC converter, and the like in the region above the battery case of FIG. 7 are detached.
Figure 9:
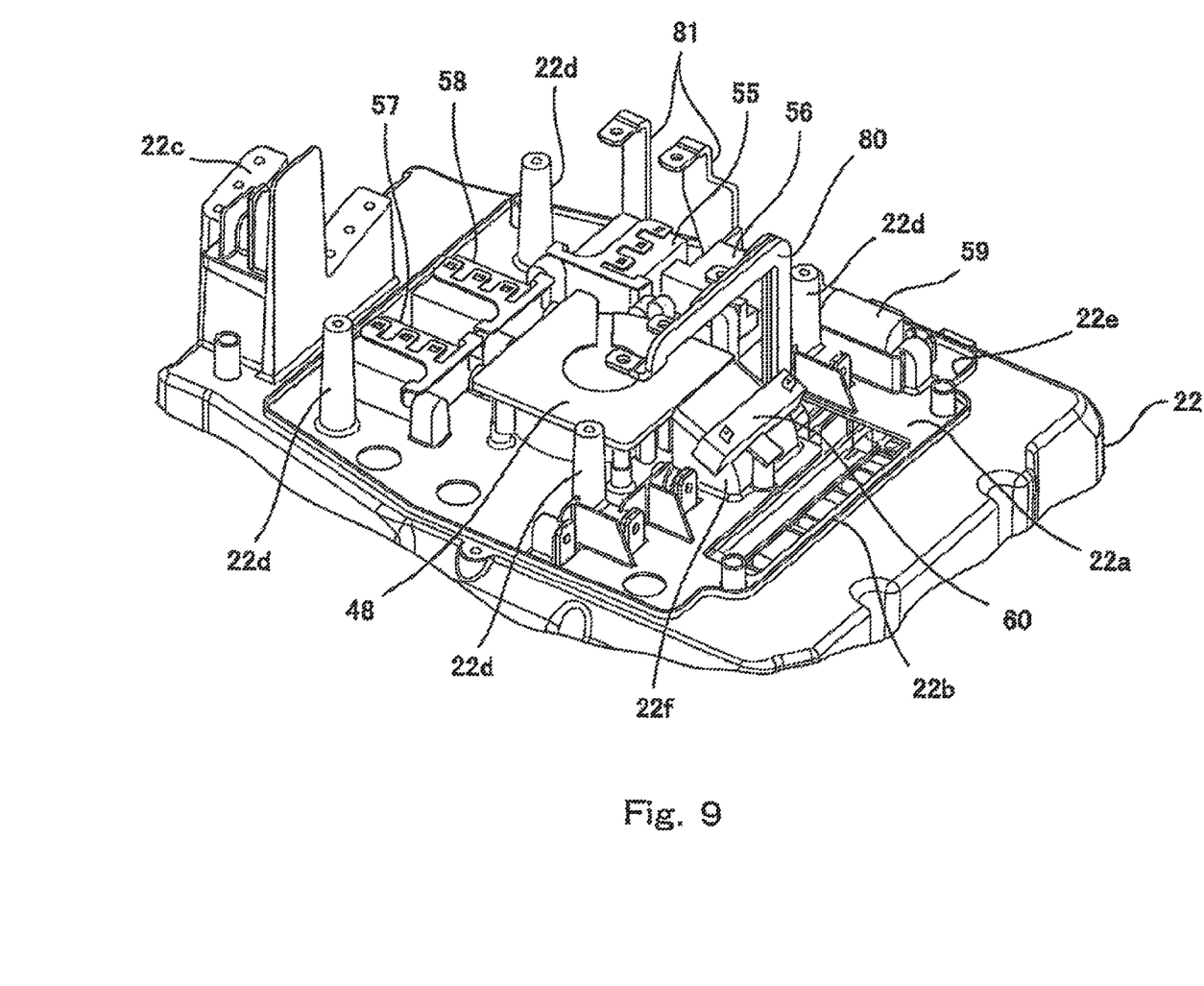
FIG. 9 is a perspective view showing a state in which an inverter and the like in the region above the battery case of FIG. 8 are further detached.

FIG. 7 is a perspective view of the region above the battery case 20 of the electric motorcycle 1 of FIG. 1, when viewed from the right and front. FIG. 8 is a perspective view showing a state in which the ECU 54, the DC/DC converter 50, and the like in the region above the battery case 20 of FIG. 7 are detached. FIG. 9 is a perspective view showing a state in which the inverter 47 and the like in the region above the battery case of FIG. 7 are further detached. As shown in FIGS. 6 and 9, the fan 48 is mounted to the center portion of the electric component region 22a provided in the upper surface of the upper case 22 of the battery case 20. The upper wall of the upper case 22 is formed with an air inlet 22g via which the electric component space S1 is in communication with the battery space S2. The fan 48 causes air to flow from the interior of the electric component space S1 into the battery space S2 through the air inlet 22g. The upper case 22 is formed with a duct section 22f defining an air passage connecting the discharge outlet of the fan 48 to the air inlet 22g.

As shown in FIG. 9, in a region of the electric component region 22a, the pair of discharging relays 55, 56 are mounted on a current supply path connecting the batteries 40 to the inverter 47, and the pair of charging relays 57, 58 are mounted on a current supply path connecting the charging connector 75 to the batteries 40. In another region of the electric component region 22a, the fuse 59 provided in a power supply circuit and the precharge resistor 60 are mounted. From the electric component region 22a, a plurality of support elements 22d on which the inverter 47 is mounted protrude upward. The electric component region 22a is provided with a pair of bus bars 81 which are electric wires protruding upward and electrically connected to the batteries 40 via the discharging relays 55, 56, the fuse 59, the precharge resistor 60, and the like. A bus bar 80 protrudes upward from the battery space S2 through an opening 22b formed in the electric component region 22a. The bus bar 80 includes three bus bars stacked together, insulatively bonded together and integrated, which are electric wires used to supply a three-phase AC current from the inverter 47 to the electric motor 42. Thus, the bus bar 80 can be easily handled, and generation of a noise can be suppressed.

As shown in FIG. 8, the inverter 47 is mounted on the support elements 22d. The inverter 47 is placed above the upper case 22, forming a slight gap with the upper surface of the upper case 22, and fastened to the battery case 20. Since heat generated in the inverter 47 travels upward, it becomes possible to prevent heat generated in the inverter 47 from being transferred to the batteries 40. Because of the vertical gap formed between the inverter 47 and the battery case 20, heat transfer to the batteries 40 can be prevented more effectively. The inverter 47 is configured to convert the DC power supplied from the batteries 40 (see FIG. 3) into AC power and supply the AC power to the electric motor 42 (see FIG. 3), and includes a semiconductor switching element. The inverter 47 is placed above the batteries 40 to overlap with the battery case 20 when viewed from above. The inverter 47 is placed above the battery case 20 to be included within the battery case 20 when viewed from above. The inverter 47 has a flat shape in which a vertical dimension is smaller than a dimension in the forward and rearward direction and a dimension in the rightward and leftward direction. The inverter 47 is placed inward relative to the front and rear edges and right and left edges of the assembly of the battery case 20 and the batteries 40 when viewed from above.

The inverter 47 is placed above the fan 48, the discharging relays 55, 56, and the charging relays 57, 58 to overlap with the fan 48, the discharging relays 55, 56, and the charging relays 57, 58 when viewed from above. In other words, the fan 48, the discharging relays 55, 56, and the charging relays 57, 58 are placed between the battery case 20 and the inverter 47. In this structure, many electric components can be placed in the electric component region 22a with a small area, and the electric wires or the like connecting them to each other, and the electric wires or the like connecting them to the batteries 40, can be reduced in length. Three terminal sections 80a of the bus bar 80 are connected to the output terminal of the inverter 47. Although not shown, the terminal sections of the bus bars 81 (see FIG. 9) are connected to the input terminal of the inverter 47.

As shown in FIGS. 6 and 7, an electromagnetic shield member 49 formed by bending a metal plate is placed over the inverter 47. The electromagnetic shield member 49 is electrically grounded at a ground potential equal to that of the electric components in a weak electric system. The electromagnetic shield member 49 includes first leg elements 49d placed on the inverter 47 to correspond to some of the support elements 22d, respectively, a first horizontal wall portion 49c extending horizontally from the upper ends of the first leg elements 49d, a vertical wall portion 49b extending upward from the end portion of the first horizontal wall portion 49c, a second horizontal wall portion 49a extending horizontally from the upper end of the vertical wall portion 49b, second leg elements 49e extending from the end portion of the second horizontal wall portion 49a and placed on the inverter 47 to correspond to the other support elements 22d, respectively, and a protruding wall portion 49f protruding from the second horizontal wall portion 49a in a L-shape when viewed from a side and in a cantilever manner. Thus, the electromagnetic shield member has a step shape.

The electromagnetic shield member 49 supports a plurality of electric components. On the upper surface of the first horizontal wall portion 49c, the ground leakage sensor 51, the DC/DC converter relay 52, and the varistor 53 are mounted. On the upper surface of the second horizontal wall portion 49a, the ECU 54 for controlling the inverter 47, the relays 52, 55 to 58, and the like are mounted. On the lower surface of the second horizontal wall portion 49a, the DC/DC converter 50 is mounted such that a gap is formed between the DC/DC converter 50 and the inverter 47. In other words, the electromagnetic shield member 49 is interposed between the DC/DC converter 50 and the ECU 54 to isolate them from each other. In this structure, the electromagnetic shield member 49 shields electromagnetic noise generated from the DC/DC converter 50 and the inverter 47 and thereby prevents the noise from being transmitted to the ECU 54. In other words, since the electric components in the weak electric system (the ECU, the sensors, etc.) are placed above the electric components in the strong electric system (the inverter, the DC/DC converter, etc.) with the metal plate interposed between the electric components in the weak electric system and the electric components in the strong electric system, space-saving can be achieved while preventing influence of the electromagnetic noise on the electric components in the weak electric system. As defined herein, the electric components in the strong electric system are configured to be applied with a voltage equal to the voltage (e.g., 200V) of the batteries 40 connected in series, while the electric components in the weak electric system are configured to be applied with a voltage (e.g., 12V) lower than the voltage of the battery group 40, and input, output and/or calculate, for example control signals, etc. Since the inverter 47 is covered by the electromagnetic shield member 49 as the outer cover member made of metal, the emission of the electromagnetic noise to outside of the electric motorcycle can be suppressed.

The electric component group 46 placed above the battery case 20 is configured such that the electric components are placed in a plurality of layers and arranged vertically to overlap with each other when viewed from above. In the present embodiment, the inverter 47 is placed above the fan 48, the discharging relays 55, 56 and the charging relays 57, 58, to overlap with the fan 48, the discharging relays 55, 56 and the charging relays 57, 58, when viewed from above, the DC/DC converter 50 is placed above the inverter 47 to overlap with the inverter 47 when viewed from above, the ECU 54 is placed above the DC/DC converter 50 to overlap with the DC/DC converter 50, when viewed from above, the ground leakage sensor 51, the DC/DC converter relay 52, and the varistor 53 are placed above the inverter 47 to overlap with the inverter 47 when viewed from above, and laterally relative to the ECU 54. In the above-described manner, the electric component group 46 is configured such that the electric components are vertically stacked together in multiple layers, without direct contact between the electric components, and arranged with a high density, with the use of the electromagnetic shield member 49 with a step shape, the support elements 22d, etc., in a limited space above the battery case 20.

Figure 10:
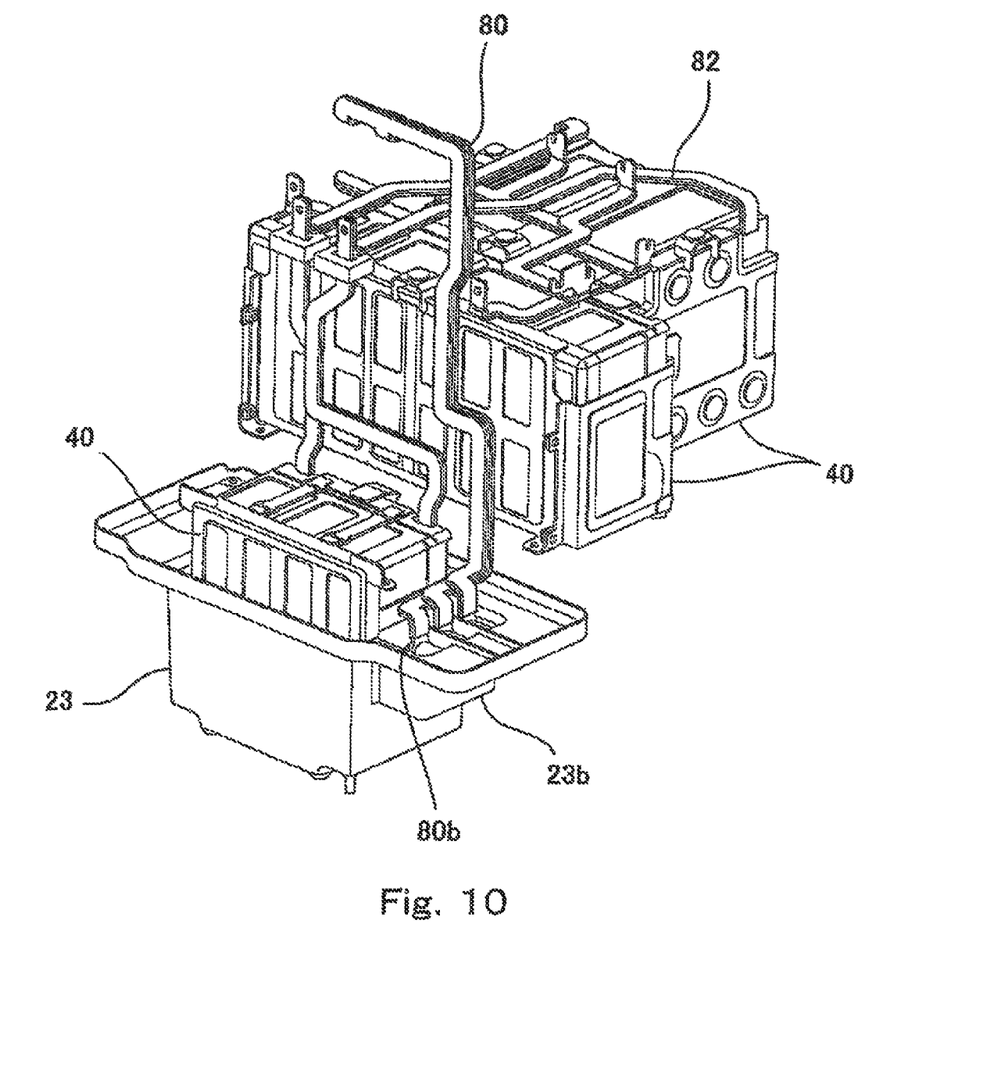
FIG. 10 is a perspective view of major components for explaining bus bars in the interior of the battery case of the electric motorcycle of FIG. 1.

FIG. 10 is a perspective view of major components for explaining the bus bars 80, 82 in the interior of the battery case 20 of the electric motorcycle 1 of FIG. 1. As shown in FIGS. 4 and 10, the bus bar 80 as the electric wire connecting the electric motor 42 (see FIG. 1) to the inverter 47 vertically passes through the interior space of the battery case 20 (see FIG. 4). Terminal sections 80b at the lower end portion of the bus bar 80 are placed in a terminal accommodating section 23b of the lower case 23. Between the terminal sections 80b in the terminal accommodating section 23b and the terminal section (not shown) of the electric motor 42, three high-voltage electric wire cables 27 (see FIG. 1) are placed to couple the terminal sections in a location outside of the battery case 20. In this case, since the lower case 23 including the terminal accommodating section 23b and the electric motor 42 are adjacent to each other in the forward and rearward direction, the high-voltage electric wire cables 27 exposed to outside can be reduced in length. As shown in FIG. 10, the batteries 40 are interconnected in series by the bus bar 82 configured as a module. The positive terminal and negative terminal of the battery group connected in series are connected to the bus bars 81 (see FIG. 9) provided in the electric component placement space to connect the battery group to the inverter 47.

Figure 11:
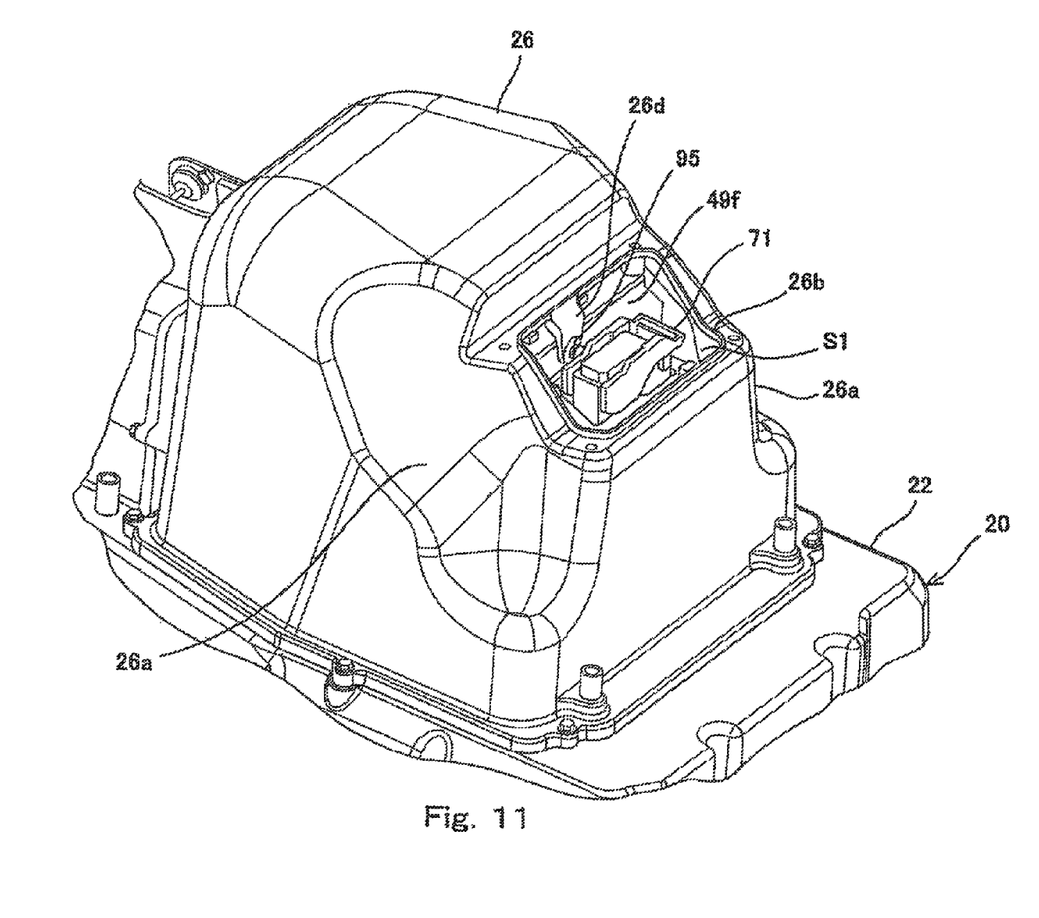
FIG. 11 is a perspective view of major components for explaining an electric component cover and a service plug of the electric motorcycle of FIG. 1.

FIG. 11 is a perspective view of major components for explaining the electric component cover 26 and the service plug 71 of the electric motorcycle 1 of FIG. 1. As shown in FIG. 11, the electric component cover 26 is formed with a plug opening 26b between right and left recesses 26a to expose the service plug 71 which is capable of disconnecting the power supply circuit. A plug lid member 73 is detachably attached to the plug opening 26b. The service plug 71 is mounted to the protruding wall portion 49f of the electromagnetic shield member 49 fastened to the battery case 20. The electric component cover 26 includes a bracket member 26d protruding toward the electric component space S1 to face the plug opening 26b. The bracket member 26d is removably fastened to the protruding wall portion 49f of the electromagnetic shield member 49 by a fastening member 95 (e.g., screw). In brief, the bracket member 26d and the fastening member 95 constitute a fastening unit. Since the electromagnetic shield member 49 is unitarily fastened to the battery case 20, the electric component cover 26 is removably fastened to the battery case 20 by the fastening unit (26d, 95).

The service plug 71 is placed in a connection position to connect the power supply circuit in a state in which the service plug 71 is mounted to the protruding wall portion 49f, or in a disconnection position in which the service plug 71 disconnects the power supply circuit in a state in which the service plug 71 is detached from the protruding wall portion 49f by a user. In the state in which the service plug 71 is placed in the connection position (i.e., state in which the service plug 71 is mounted to the protruding wall portion 49f), the fastening member 95 is hidden by the service plug 71 and is not detachable, and the electric component cover 26 is not detachable. On the other hand, in the state in which the service plug 71 is placed in the disconnection position (i.e., state in which the service plug 71 is detached from the protruding wall portion 49f), the fastening member 95 is exposed from the service plug 71 and is detachable, and the electric component cover 26 is detachable.

In accordance with the above described configuration, the electric component group 46 is configured such that the electric components are placed in a plurality of layers and arranged vertically to overlap with each other when viewed from above, in a location above the batteries 40. Therefore, the batteries 40 with a heavy weight can be placed at a lower side to lower the center of gravity of the vehicle body. In addition, water splashing from the ground surface is less likely to contact the electric component group 46, and therefore, the electric component group 46 need not be highly water-proof. Since the electric component group 46 is placed above the battery case 20 and configured such that the electric components are placed in a plurality of layers and arranged vertically, the electric component group 46 is made close to the batteries 40 to reduce the electric wires of the electric component group 46 in length and the electric components of the electric component group 46 can be laid out in a compact manner, in the space above the batteries 40.

The electric component group 46 is placed above the battery case 20 and the batteries 40 and the electric component group 46 are close to each other while keeping the various members from being arranged in the interior of the battery case 20. Since the electric component group 46 is placed above the battery case 20, it becomes possible to prevent heat generated in the electric component group 46 from travelling into the battery case 20, and suppress a temperature increase in the interior of the battery case 20. Further, the inverter 47 with a larger occupation area than those of the relays 55 to 58 is placed above the discharging relays 55, 56 and the charging relays 57, 58, at a distance from the upper surface of the battery case 20. In this layout, the discharging relays 55, 56 and the charging relays 57, 58 can be placed between the battery case 20 and the inverter 47 more flexibly, and the electric wires extending from the interior of the battery case 20 and connected to the relays 55 to 58 can be reduced in length.

Since the electric component group 46 placed above the battery case 20 is covered by the electric component cover 26 from above, the water-proofing of the battery case 20 can be improved. Since the electric components in the strong electric system (the inverter 47, the DC/DC converter 50, etc.) are placed below at least one of the electric components in the weak electric system (the ECU 54, the sensor 51, etc.), the electric wires connecting the electric components in the strong electric system to the batteries 40 can be reduced in length.

The electromagnetic shield member 49 serves to support at least one of the electric components of the electric component group 46 placed in a plurality of layers while preventing the electromagnetic noise generated in the switching element from being transmitted to other electric components. Therefore, the members can be reduced in number. In the state in which the service plug 71 is operated to the connection position, the fastening member 95 is hidden by the service plug 71 and is not detachable, and the electric component cover 26 is not detachable. Therefore, the electric component cover 26 cannot be detached unless the service plug 71 disconnects the power supply circuit. This makes it possible to prevent a situation in which the electric component cover 26 is detached and maintenance of the electric component group 46 is carried out in the state in which the power supply circuit is connected.

Since the ECU 54 is located at a distance from the batteries 40 and the inverter 47 is placed between the ECU 54 and the batteries 40, in the electric component space 51, the high-voltage electric wires connecting the inverter 47 to the batteries 40 can be reduced in length. The discharging relays 55, 56 and the charging relays 57, 58 are mounted on the upper surface of the battery case 20, and the inverter 47 is placed above the relays 55 to 58, forming a gap with the upper surface of the battery case 20. In other words, the inverter 47 with a larger occupation area than those of the relays 55 to 58 is placed above the relays 55 to 58 at a distance from the upper surface of the battery case 20. In this layout, both of the discharging relays 55, 56 and the charging relays 57, 58 can be placed on the upper surface of the battery case 20 more flexibly, and the electric wires extending from the interior of the battery case 20 and connected to the relays 55 to 58 can be reduced in length.

The electric component group 46 is accommodated in the electric component space S1 of the electric component cover 26 fastened to the battery case 20. Since the whole power unit 19 is detachably mounted to the vehicle body in the state in which the electric component group 46 is fastened to the battery case 20, the operation for assembling the components can be performed more efficiently. Since the electric component group 46 including the inverter 47 is placed forward relative to the rear end of the battery group 40, there is a sufficient space between the vehicle body and the abdominal part of the driver seated on the seat 30 and gripping the handle 6. Therefore, the driver can drive the electric motorcycle in a comfortable posture. Since the charging connector 75 is placed rearward relative to the electric component group 46 including the electric components stacked together, and is smaller in vertical dimension than the electric component group 46 is, the charging connector 75 can be placed in a compact manner while avoiding the driver from driving in a crammed posture. Since the charging connector 75 is placed just in front of the seat 30, it becomes possible to prevent a situation in which the driver starts the electric motorcycle 1 in the state in which the power supply connector 90 is connected to the charging connector 75. Since the upper cover 28 is made of a metal material, the electric component group 46 and the charging connector 75 can be protected even when the vehicle body falls or collides with an obstacle.

Since the electric component group 46 is placed above the batteries 40, the electric components can be assembled more easily than in a case where the electric components are placed below the batteries 40. Since the electric component group 46 including the inverter 47 is placed on the upper case 22 detachably mounted to the middle case 21 of the battery case 20, assembly can be carried out in a state in which the electric component group 46 and the battery case 20 are integrated as a sub-assembly. When the battery case 20 is detached from the vehicle body, the electric component group 46 can be detached from the vehicle body together with the batteries 40. This allows an operator to easily check the operation of the batteries 40 in the state in which the batteries 40 are detached from the vehicle body before or after shipping.

The electric components mounted in the electric motorcycle may be partially or entirely accommodated in the battery case 20. The vehicle may be a vehicle including three or more wheels, for example an ATV (all-terrain vehicle), so long as the vehicle is a straddle-type vehicle. The charging connector 75 may be placed inside of the battery case 20. The electric component cover 26 may be omitted. The present invention is not limited to the above-described embodiment, and its configuration can be changed, added to, or deleted from within the scope of the invention.

INDUSTRIAL APPLICABILITY

As described above, an electric vehicle of the present invention is configured such that batteries with a heavy weight are placed at a lower side to lower the center of gravity of a vehicle body and electric components are made close to the batteries to reduce the electric wires of the electric components in length. Therefore, the electric vehicle of the present invention is widely applicable to an electric motorcycle, etc., which can achieve this advantage.

REFERENCE CHARACTER LIST 1 electric motorcycle (electric vehicle)
2 front wheel
3 rear wheel
20 battery case
26 electric component cover
26b plug opening
40 battery
42 electric motor
46 electric component group
47 inverter
49 electromagnetic shield member
55, 56 discharging relays
71 service plug
73 plug lid member
80 bus bar (electric wire)

The invention claimed is:

1. An electric vehicle comprising:
an electric motor which generates driving power for driving a wheel;
a battery case accommodating a battery storing DC power to be supplied to the electric motor, in a battery space in an interior of the battery case; and
a plurality of electric components electrically connected to the battery and placed above the battery,
wherein the plurality of electric components are placed in a plurality of layers, and arranged vertically to overlap with each other when viewed from above,
wherein the plurality of electric components include an inverter which supplies electric power to the electric motor, and a relay provided on a current supply path connected to the battery to open and close the current supply path,
wherein the inverter is placed above the battery case, forming a gap with an upper surface of the battery case, and
wherein the relay is placed between the battery case and the inverter.

2. The electric vehicle according to claim 1,
wherein the plurality of electric components are placed above the battery case.

3. The electric vehicle according to claim 1,
wherein the plurality of electric components are integrated and fastened to the battery case.

4. An electric vehicle comprising:
an electric motor which generates driving power for driving a wheel;
a battery case accommodating a battery storing DC power to be supplied to the electric motor, in a battery space in an interior of the battery case;
a plurality of electric components electrically connected to the battery and placed above the battery; and
an electric component cover covering the plurality of electric components placed above the battery case, from above,
wherein the plurality of electric components are placed in a plurality of layers, and arranged vertically to overlap with each other when viewed from above.

5. The electric vehicle according to claim 4, further comprising:
an electromagnetic shield member interposed between a first electric component and a second electric component, of the plurality of electric components, to isolate the first electric component and the second electric component from each other,
wherein at least one of the first electric component and the second electric component includes a switching element.

6. The electric vehicle according to claim 5,
wherein the electromagnetic shield member supports at least one of the plurality of electric components.

7. The electric vehicle according to 4, further comprising:
a service plug accommodated in an electric component space and capable of disconnecting a power supply circuit,
wherein the electric component cover is placed on an upper side of the battery case to form the electric component space accommodating the plurality of electric components,
wherein the electric component cover has a plug opening through which the service plug is exposed,
wherein the electric component cover is detachably fastened to the battery case by a fastening unit,
wherein the service plug is operated to a disconnection position at which the power supply circuit is disconnected, or a connection position at which the power supply circuit is connected,
wherein in a state in which the service plug is operated to the disconnection position, the fastening unit is exposed from the service plug and is detachable, and the electric component cover is detachable, and
wherein in a state in which the service plug is operated to the connection position, the fastening unit is hidden by the service plug and is not detachable, and the electric component cover is not detachable.

8. The electric vehicle according to claim 4,
wherein the battery case includes a case body, and an upper case which closes an upper opening of the case body, and
wherein the plurality of electric components are fastened to the upper case.

9. An electric vehicle comprising:
an electric motor which generates driving power for driving a wheel;
a battery case accommodating a battery storing DC power to be supplied to the electric motor, in a battery space in an interior of the battery case; and
a plurality of electric components electrically connected to the battery and placed above the battery,
wherein the plurality of electric components are placed in a plurality of layers, and arranged vertically to overlap with each other when viewed from above,
wherein the plurality of electric components include an electric component in a strong electric system and a plurality of electric components in a weak electric system, and
wherein the electric component in the strong electric system is placed below at least one of the plurality of electric components in the weak electric system.

* * * * *